United States Patent [19]
Hou et al.

US005731265A

[11] Patent Number: 5,731,265
[45] Date of Patent: Mar. 24, 1998

[54] PLANT TREATMENT PROCESS

[75] Inventors: Tian Zhen Hou; John S. Destito, both of Walla Walla, Wash.

[73] Assignee: Virgin Partners, Inc., Nevis, St. Kitts/Nevis

[21] Appl. No.: 394,020

[22] Filed: Feb. 23, 1995

[51] Int. Cl.[6] .................... H01N 65/00; A01G 7/00; C05F 11/02; C05G 1/00

[52] U.S. Cl. .................... 504/121; 504/116; 47/58; 47/DIG. 12; 71/24; 71/32; 71/54; 71/61

[58] Field of Search .................... 504/116, 121; 47/58, DIG. 12; 71/24, 32, 54, 61

[56] References Cited

U.S. PATENT DOCUMENTS

| | | | |
|---|---|---|---|
| 3,703,051 | 11/1972 | Weinberger | 47/58 |
| 4,055,915 | 11/1977 | Charnoe | 47/58 |
| 4,680,889 | 7/1987 | Carlson | 47/58 |
| 4,743,287 | 5/1988 | Robinson | 71/12 |
| 4,834,789 | 5/1989 | Carlson | 504/116 |
| 4,952,229 | 8/1990 | Muir | 47/58 |
| 5,034,045 | 7/1991 | Alexander | 71/24 |
| 5,043,009 | 8/1991 | Carlson | 504/116 |

*Primary Examiner*—Brian M. Burn
*Assistant Examiner*—Brian Bembenick
*Attorney, Agent, or Firm*—Townsend and Townsend and Crew LLP

[57] ABSTRACT

The present invention relates, in general, to a process of treating plants and, in particular, to a process of stimulating plant growth and development by subjecting the plants to sound waves and by exposing the plants to a nutrient formulation. The invention further relates to a method of increasing the absorption capacity of plants.

23 Claims, 4 Drawing Sheets

| PARAMETER | METHOD | RESULTS (ppm) |
|---|---|---|
| SAMPLE ID: Raw | | |
| SAMPLE No: 9408-124-1 | | |
| Turbidity | EPA180.1 | 0.7 NTU |
| Color | EPA110 | 5. CU |
| Odor | | 0. TON |
| Radium 228 | EPA904 | 0.1 ± 0.4 pCi/L |
| Arsenic | EPA206.2 | None detected* |
| Cadmium | EPA200.7 | None detected |
| Chloride | SM4500B | 1.0 |
| Chromium | EPA200.7 | None detected |
| Copper | EPA200.7 | None detected |
| Iron | EPA200.7 | None detected |
| Lead | EPA239.2 | None detected |
| Manganese | EPA200.7 | None detected |
| Mercury | EPA245.1 | None detected |
| Nitrogen, Nitrate | EPA353.3 | None detected |
| Phenol, Total | EPA420.1 | None detected |
| Selenium | EPA270.2 | None detected |
| Silver | EPA200.7 | None detected |
| Sulfate | EPA375.4 | None detected |
| Zinc | EPA200.7 | 0.02 |
| Fluoride | EPA340.2 | None detected |
| Aerobic Plate Count - Liquid | AOAC966.23 | 208.CFU/mL |
| pH | EPA150.1 | 6.5 Standard Units |
| Surfactants | EPA425.1 | None detected |
| Solids, Total Dissolved | EPA160.1 | 16. |
| Barium | EPA200.7 | None detected |
| Nitrogen, Nitrite | EPA354.1 | 0.01 |
| AS/SE Digestion in Water | EPA206.2/270.2 | |

*Based on laboratory detection limits.

FIG. 1A

SAMPLE ID: Raw
SAMPLE No: 9408-124-1

EPA Method 502.2 - Volatile Organics

| Name | MDL | Sample Results (mg/L) |
|---|---|---|
| Trichloroethylene (TCE) | 0.0005 | None Detected* |
| Carbon Tetrachloride | 0.0005 | None Detected |
| Vinyl Chloride | 0.0005 | None Detected |
| 1,2-Dichloroethane (DCA) | 0.0005 | None Detected |
| Benzene | 0.0005 | None Detected |
| 1,1-Dichloroethylene (DCE) | 0.0005 | None Detected |
| 1,1,1-Trichloroethane (TCA) | 0.0005 | None Detected |
| p-Dichlorobenzene | 0.0005 | None Detected |
| Bromobenzene | 0.001 | None Detected |
| Bromodichloromethane | 0.001 | None Detected |
| Bromoform | 0.001 | None Detected |
| Bromomethane | 0.001 | None Detected |
| Chlorobenzene | 0.0005 | None Detected |
| Chlorodibromomethane | 0.001 | None Detected |
| Chloroethane | 0.001 | None Detected |
| Chloroform | 0.001 | None Detected |
| Chloromethane | 0.001 | None Detected |
| o-Chlorotoluene | 0.001 | None Detected |
| p-Chlorotoluene | 0.001 | None Detected |
| o-Dichlorobenzene | 0.0005 | None Detected |
| Dibromomethane | 0.001 | None Detected |
| Dichlorodifluoromethane | 0.001 | None Detected |
| m-Dichlorobenzene | 0.001 | None Detected |
| cis-1,2-Dichloroethylene | 0.0005 | None Detected |
| trans-1,2-Dichloroethylene | 0.0005 | None Detected |
| 1,1-Dichloroethane | 0.001 | None Detected |
| 1,2-Dichloropropane | 0.0005 | None Detected |
| Dichloromethane | 0.001 | None Detected |
| 2,2-Dichloropropane | 0.001 | None Detected |
| 1,3-Dichloropropane | 0.001 | None Detected |
| 1,3-Dichloropropene | 0.001 | None Detected |
| 1,1-Dichloropropene | 0.001 | None Detected |
| Fluorotrichloromethane | 0.001 | None Detected |
| Ethylbenzene | 0.0005 | None Detected |
| Styrene | 0.0005 | None Detected |
| 1,1,1,2-Tetrachloroethane | 0.001 | None Detected |
| 1,1,2,2-Tetrachloroethane | 0.001 | None Detected |
| 1,1,2-Trichloroethane | 0.001 | None Detected |
| Tetrachloroethylene | 0.0005 | None Detected |
| 1,2,3-Trichloropropane | 0.001 | None Detected |
| Toluene | 0.0005 | None Detected |
| Total Xylenes | 0.0005 | None Detected |
| TTHM | 0.001 | None Detected |

*Based on laboratory detection limits.

FIG. 1B

| PARAMETER | METHOD | RESULTS (ppm) |
|---|---|---|
| SAMPLE ID: Additional Raw Sample | | |
| SAMPLE No: 9408-124-3 | | |
| Cyanide, Total | EPA335.2 | None detected* |
| Moisture | EPA160.3 | 100% |
| Phosphorus, Total | EPA365.3 | 0.14 |
| Total Hardness | EPA130 | 12. |
| Oxidizable Substances | USP | 10. |
| Calcium | EPA200.7 | 3. |
| Magnesium | EPA200.7 | None detected |
| Turbidity | EPA180.1 | 0.7 NTU |

*Based on laboratory detection limits.

FIG. 1C

```
==================================================================
                        SOIL TEST RESULTS
==================================================================
```

| NITRATE NITROGEN | ppm | 173 | pH | 5.4 |
|---|---|---|---|---|
|  | lbs/acre | 552 | BUFFER pH | 5.7 |
| PHOSPHORUS | ppm | 10 |  |  |
| POTASSIUM | ppm | 230 |  |  |
| SULFUR | ppm | 26 |  |  |
|  |  |  |  |  |
| CALCIUM | meq/100g | 9.9 |  |  |
| MAGNESIUM | meq/100g | 2.0 |  |  |

```
==================================================================
SUM OF TESTED NITROGEN    lbs/acre              552
LIME REQUIREMENT FOR FIELD AND VEG. CROP 1.8 ton/acre 8"
LIME REQUIREMENT FOR ALFALFA IS 2.9 ton/acre
==================================================================
```

VERY HIGH NO3N

*FIG.2*

PLANT TREATMENT PROCESS

TECHNICAL FIELD

The present invention relates, in general, to a process of treating plants and, in particular, to a process of stimulating plant growth and development by subjecting the plants to sound waves and by exposing the plants to a nutrient formulation. The invention further relates to a method of increasing the absorption capacity of plants.

BACKGROUND

Numerous processes and compositions have been developed that can be used to stimulate plant growth. Various fertilizer formulations and plant hormone compositions are available for use with crop plants to increase yields. In areas of the world where population density is high and the availability of food is low, there is a great demand for agents that can be used to maximize plant production.

While there are a variety of chemical approaches to stimulating plant growth, processes have also been described that are based on physical principles (eg sound—see Spillane, Brave New Waves: TCL for Plants pp 26–29 (1991); Hai Xiao, Pictorial Science 6:36 (1990)), or on a combination of physical and chemical principles. An example of the latter is the technology developed by D. R. Carlson which involves subjecting plants to high frequency (eg 4–6 kilohertz) sound waves while applying a chemical growth stimulator (see U.S. Pat. Nos. 4,680,889, 4,834,789 and 5,043,009). Carlson reports that this technology promotes growth of plants of various types.

The present invention relates to a process of stimulating plant growth that also includes both the elements of sound and nutrient application. In the present approach, however, low frequency sound waves are used in combination with a novel nutrient composition. This approach provides a reliable method of increasing yields and growth rates of plants while improving resistance to diseases and other environmental factors. The use of sound waves in accordance with the present invention can increase the absorptive capacity of plants.

SUMMARY OF THE INVENTION

The present invention relates to a method of stimulating plant growth or development comprising subjecting the plant to low frequency sound waves and applying to the plant a nutrient composition.

The present invention also relates to a method of increasing disease resistance of a plant comprising subjecting the plant to sound waves of a low frequency, eg 50–3800 Hz, at a volume and for a time sufficient to effect the increased resistance.

A further embodiment of the present invention relates to a plant nutrient composition that includes humic acid, manganese, zinc, and copper.

Another embodiment of the present invention relates to a plant nutrient composition that includes humic acid, nitrogen, phosphorus and potassium in glacier water.

Objects and advantages of the present invention will be clear from the description that follows.

BRIEF DESCRIPTION OF THE DRAWINGS

FIGS. 1A, 1B, and 1C. Analyses of Tahoma water samples from Glacier Water Company.

FIG. 2. Soil analysis.

DETAILED DESCRIPTION OF THE INVENTION

The present invention relates to a process of treating plants to stimulate growth and/or development. The process results in increased flowering and/or fruit yield and/or increased resistance to disease. The process comprises subjecting plants to low frequency sound waves. The sound waves can be broadcast while the plants are in contact with a nutrient-containing composition. The invention also includes subjecting seeds to this sound/nutrient strategy to enhance germination and/or subsequent growth properties.

Sound waves suitable for use in the present process are, generally, of a frequency less than 4000 Hertz, preferably, between 50 and 4000 Hertz, more preferably, between 80 and 3800 Hertz. While the frequency can be optimized for a particular plant (or seed) and for a particular set of growth conditions, frequencies of about 100, 300, 500, 1000 or 3000 Hertz are typically applicable. Examples of frequencies (or frequency ranges) suitable for use with specific plants are set forth in Table 1.

Table 1

50–120 HZ

Phylodendron (Alocasia)

100 HZ

Daikon Japanese Radish
Green Leaf Spinach
Red Loose Leaf Lettuce
Salinas Iceberg Lettuce
Red Sails Loose Leaf Lettuce
Pickling Cucumbers
Japanese Burpless Cucumbers
Earligold Cantaloupe
Yellow Doll Watermelon

150–300 HZ

Sweet Corn
Red Pontiac Potato
Early Green Cabbage
Oregon Shelling Pea
Kentucky Brown Pole Bean
Japanese Soybean

300–500 HZ

Green Valiant Broccoli
Snow Crown Cauliflower

The low frequency sound waves of the invention can be generated in any convenient manner. For example, a speaker of the type described in U.S. Pat. No. 3,819,005 can be used (eg Soundsphere (TerraSphere) Model 110 H.F., size (height)— 34.5 cm; size (width)—37.0 cm; weight—25 kg; speaker size—15 cm; impedence—8 ohms; speaker frequency range—50 to 20,000 Hertz; dispersal pattern—178° by 360°; voltage requirements—110 volts AC (50/60 hz)). While the use of a speaker to broadcast the sound waves is preferred, a sound recording can also be used (for example, for small scale farming (eg home gardening)). Sound waves can be constant or pulsed (eg about 120 pulses per minute) or can be produced using a non-random sweeping modulator.

The volume of sound waves suitable for use in the present process can be at least 50 decibels at the site of the plant or seed, 70 to 80 decibels being preferred. The volume can be optimized, for example, for any particular plant or growth conditions.

The nutrient formulation utilized in the process of the present invention can be optimized for a particular plant or growth conditions and can include humic acid and manganese, zinc, iron and copper (eg as the sulfate or sulfonate, as appropriate). A chelating agent, such as EDTA, can be included. The identification, eg by soil analysis, of a sufficiency or excess of a particular component (eg iron) in the growth substrate can indicate that that component should be eliminated from the formulation. Table 2 provides an example of a formulation concentrate (to be diluted 1:500 with water prior to use) of the invention.

TABLE 2

| Material | Analysis | Lbs per ton |
|---|---|---|
| water | 0-0-0 | 1242.66 |
| epsom salts | 9.6% Mg. | 206 |
| phosphoric acid | 0-61.2-0 | 3 |
| caustic potash | 0-0-41 | 2 |
| potassium nitrate | 13-0-44 | 50 |
| urea | 46-0-0 | 107 |
| humic acid | 0-0-0 | 20 |
| ligninsulfonate | 0-0-0 | 200 |
| Manganese sulfate | 32% Mn | 62 |
| zinc sulfonate | 36% Zn | 56 |
| iron sulfonate | 20% Fe | 10 |
| solubor | 20.5% B | 9 |
| sodium molybdate | 37% Mo | .5 |
| copper sulfate | 25% | 4 |
| EDTA | 0-0-0 | 11.42 |
| molasses | 0-0-0 | 11.42 |
| Kelp | 0-0-0 | 5 |
| totals | | 2,000 |

N-P-K = 2.8-0.08-1.15, 1% Mg, 1% Mn, 0.05% Cu, 0.1% Fe, 1% Zn, 0.05% B, 0.01% Mo

The components of the nutrient formulations of the invention are, advantageously, mixed with pure water, for example, pure glacier water (Tahoma glacier water from Mount Rainer being preferred (see FIG. 1 for analysis of Tahoma water samples)). The formulation can be prepared as a concentrate (eg a 1/500 concentrate) and diluted prior to use with clean (eg purified) water.

The nutrient formulation can be applied to the plant using any of the various modes of application, foliar spraying being preferred. The amount applied and the application regimen used can be optimized for any particular plant and/or set of growth conditions (see Table 3 for examples of typical applications).

TABLE 3

| Row Crop: | 12.8 oz concentrate*/hectare/application |
| | 5.8 oz concentrate/acre/application |
| Bush Crop: | 25.6 oz concentrate/hectare/application |
| | 11.6 oz concentrate/acre/application |
| Tree Orchards: | 42.7 oz concentrate/hectare/application |
| | 19.4 oz concentrate/acre/application |

*concentrate: dilute 1 part formulation to 500 parts water prior to use

Advantageously, application of the nutrient formulation is made after the plant has reached a height of about 5 to 30 cm, preferably, about 10 cm, and the frequency of application is, preferably, about once or twice per week. In the case of seeds, application can be made by soaking the seeds in the formulation for a period of, for example, 4 to 24 hours, more preferably, about 12 hours prior to sowing.

In accordance with the present invention, the plant or seed can be in contact with the nutrient formulation as the plant or seed is subjected to the sound waves. Seeds can be subjected to the sound waves for a period, for example, of 4 to 24 hours, preferably, 4 to 12 hours, more preferably, about 12 hours. Advantageously, the seeds are in contact with the nutrient formulation throughout the broadcast period.

Plants can be subjected to the sound waves for a period, for example, of 2 to 8 hours, preferably 2 to 4 hours. Advantageously, the plant is subjected to the sound waves for a period of, for example, 0.5 to 2.0 hours, preferably, 0.5 to 1.0 hours prior to contacting the plant with the nutrient formulation. The broadcasting is then, advantageously, continued during the nutrient formulation application period (eg foliar spraying period) and further continued for a period of, for example, 1 to 3 hours after completion of the application, preferably, 1 to 2 hours, more preferably, about 2 hours. The plants can also be subjected to the sound waves in the absence of nutrient application.

The process of the present invention is applicable to virtually any plant, the following are merely examples: row crops such as lettuce, spinach, soy beans and onions; bush crops such as rasberries, tomatoes and bush beans; tree orchards, including apple trees, cherry trees, and peach trees; and ornamentals including flowers and *Taxus baccata* (ornamental yew).

Certain aspects of the present invention are described in greater detail in the non-limiting Example that follows.

EXAMPLE

Experimental Details

Test Field

The Rainier site is located within the suburban area of Olympia, Wash., USA. Two test sections were used in the same general area and placed 200 meters apart. The treated experimental group was in an area slightly more shaded than the non-treated control group. Nine seed beds were set up and divided into 4×2 sections (8 cm$^2$). The soil in the seed beds was changed over to a mixture that was purchased for this test (see FIG. 2 for soil analysis). The irrigation water that was used was from a local undergound well.

Plants

The test crops planted were: Pontiac red potatoes, Japanese soybeans, Kentucky Wonder brown pole beans, Oregon shelling peas, and sweet corn. Vegetables were: Japanese Daikon radish, leaf spinach, 3 varieties of Lettuce, Early Green cabbage, 2 varieties of cucumbers, Earligold cantaloupe, Yellow Doll watermelon, Green Valiant broccoli, and Snow Crown cauliflower.

Broadcast System

An audio frequency speaker was used that has 5 variable low frequencies and that produces an intermittent pulse of sound waves. The instrument (a box speaker with on/off switch and volume control) can use 220V/50 Hz, 110V/60 Hz AC or 12V DC.

Nutrient Formulation

The nutrient formulation used was derived from a concentrate including Mount Rainer glacier water, humic acid, manganese sulfate, zinc sulfonate, iron sulfonate and copper sulfate. Concentrations of these components in the formulation as applied corresponded to 1:500 dilutions of the concentrations of these components as shown in Table 2.

Treatment Methodology

Seeds were treated before sowing in the experimental group. Seeds of above-referenced plants (except potatoes) were soaked separately for 12 hours in a solution of the nutrient formulation described immediately above. While being soaked, the seeds were subjected to a broadcast of sound waves of a frequency of 300 Hz for 4 hours at about 70 decibels. The control groups were soaked in water for 12 hours and were not subjected to the sound broadcast.

Field Treatment

Planting (except for potatoes) occurred on July 13. When the seedlings were nearly 10 cm in height, treatment began at 2 times each week (a few days apart). Prior to treatment, a broadcast of sound waves of 100 Hz frequency at about 80 decibels for a half hour was provided in the experimental group only. Foliar spraying of the fertilizer to the face of the plant leaves by a hand sprayer while the frequency broadcast contined was the next step in the treatment. After spraying, the sound waves continued to be broadcast for about another 2 hours. Meanwhile, the control group was only sprayed with water. Irrigation of both groups was done by hand bucket each day as necessary. Loosening of the soil, weeding, and thinning were carried out as necessary. Each day, a visual inspection and recording of the growth and development of the plant was made. Except for the radish and spinach, which were harvested on September 9th, all other plants were harvested on October 2nd when they were subjected to the first hard frost of the season.

Results

1. Pontiac Red Potato

Eight seed potatoes were planted on June 30th in both the control group and the treated experimental group. Harvest was on October 2nd. The total growth period was 94 days. After the harvest, the potatoes in both groups were classified into large, medium, and small grades: >0.4 lb/each was large; 0.1–0.4 lb/each was medium grade; <0.1 lb/each was small grade.

Table 4 shows that the differences between treated and untreated groups were significant. The yield amount of potatoes in the treated group increased 75% over the yield amount of potatoes in the control group. The weight of the large potato yields in the treated experimental group increased 46.82% over the untreated control group. The physical quality and texture of the potato were also improved in the treated group.

TABLE 4

| Grade | Treated Experimental Group | | Untreated Control Group | | |
|---|---|---|---|---|---|
| | Amount | Weight (lb) | Amount | Weight (lb) | Increase % |
| Large | 49 | 20.76 | 28 | 14.14 | 46.82 |
| Medium | 8 | 1.17 | 19 | 3.09 | |
| Small | | 1.15 | | 3.08 | |
| Total | | 3.08 | | 20.31 | 13.63 |

2. Japanese Daikon Radish

The radish seeds were planted on July 13th. Because many of the seedlings began to go to seed on September 9th and a determination of the effects of the treatment on 2nd and 3rd generation seeds was sought, the two biggest radish were harvested in each group for basic comparisons.

Table 5 shows a 119.23% increase in weight by the treated experimental group over the untreated control group.

TABLE 5

| Treated Experimental Group | | Untreated Control Group | |
|---|---|---|---|
| Radish 1. | Long 38.1 cm | 1. Long | 22.9 cm |
| Radish 2. | Long 31.8 cm | 2. Long | 19.1 cm |
| Total weight 1.14 lbs | | Total weight 0.52 lbs | |

3. Leaf Spinach

Planting was on July 13th and harvest was on September 9th. The total growth period was 58 days. Most of the mature spinach plants were retained to monitor the heredity properties of the seed. Only the largest spinach plants in both the treated experimental and untreated control groups were harvested for test comparisons.

Table 6 shows the results of treated spinach as the most dramatic out of all the test results. The weight of treated spinach not only increased approximately 5.6 times (557%) over the untreated control group, but the resistance of the treated group to disease increased as well. One third of the spinach seedlings died by a disease in the control group. Seedling growth was sturdy and without disease in the treated experimental group.

TABLE 6

| Treated Experimental Group | Untreated Control Group |
|---|---|
| Leaf (length & width): | 50.8 × 20.3 cm | 29.2 × 8.9 cm |
| Root (length & diameter): | 15.2 × 1.9 cm | 6.35 × 0.6 cm |
| Weight: | 0.92 lbs | 0.14 lbs |
| Growth: healthy and strong | | diseased |

4. Lettuce

Table 7 shows that the weight of all three varieties of lettuce was increased at least 100% in the treated group (growth period as described above for leaf spinach). The Salinas iceberg lettuce registered an increase of 4.7 times (472.22%) over the untreated control group.

TABLE 7

| | Treated Group | | Control Group | | |
|---|---|---|---|---|---|
| Varieties | Height (cm) | Weight (lbs) | Height (cm) | Weight (lbs) | Increase Weight % |
| 1. Red loose leaf lettuce | 27.9 | 0.50 | 17.8 | 0.21 | 138.10 |
| 2. Salinas iceberg lettuce | 17.7 | 1.03 | 15.2 | 0.18 | 472.22 |
| 3. Red sails loose leaf | 22.9 | 0.58 | 17.8 | 0.24 | 141.67 |

5. Early Green Cabbage

The treated cabbage head was weighed at 2.62 lbs. The untreated cabbage head weighed 1.91 lbs. The weight of the treated experimental group increased 37.17% over the untreated control group.

The following crops and vegetables were planted on July 13th. Due to the cold weather and a hard frost on October 2nd, many species could not fully mature. Each was harvested separately for basic comparison purposes.

6. Cucumber

Tables 8 and 9 show that the amount of blossoms increased and the weight of treated cucumbers was increased more than one time over the untreated control group.

(A) Pickling Cucumber

TABLE 8

| Treated Group | | Control Group | | Increase % |
|---|---|---|---|---|
| Additional blossoms | 173 | | 69 | 150.72 |
| 3 Large weight (lbs) | 1.90 | 3 Large | 2.15 | |
| 49 Medium weight (lbs) | 8.93 | 15 Medium | 1.14 | |
| Total blossoms 52 | 10.53 (lbs) | 18 | 3.29 | 220.06 |

(B) Japanese Burpless Cucumber

TABLE 9

| Treated Group | | Control Group | | Increase % |
|---|---|---|---|---|
| Additional blossoms | 20 | | 2 | 566.66 |
| 2 Large weight (lbs) | 1.85 | 2 Large | 1.07 | |
| 4 Medium weight (lbs) | 0.81 | 1 Medium | 0.04 | |
| Total blossoms 6 | 2.66 (lbs) | 3 | 1.11 | 139.64 |

7. Earligold Cantaloupe

There were 15 young cantaloupes found on the vines in the treated experimental group, while there were only 7 found on the vines in the untreated control group. The amount of cantaloupes in the treated group demonstrates an increase 114.29% over the untreated control group.

8. Yellow Doll Watermelon

There were 17 young watermelons found on the vines in the treated experimental group, while there were only 7 found on the vines in the untreated control group. The amount of watermelons in the treated group demonstrates an increase of 142.86% over the untrated control group.

9. Oregon Shelling Pea

When frost first appeared on October 2nd, the pea seedlings were in the state of bearing pods. The mature pea pods weighted 0.75 lbs. in the treated experimental group, and 0.83 lbs. in the untreated control group. The weight of the treated group yield was 9.6% less than the yield in the control group. The pea seedlings in the untreated control group were badly diseased with a white powder-like disease. However, there was not a seedling in the treated experimental group that had any trace of the same disease.

10. Japanese Soybean and Kentucky Brown Pole Bean

All the branches, leaves and pods of the soybeans and part of the pole beans in the treated experimental group were eaten by wild rabbits, while test crops in the untreated control group were not attacked and eaten by the same wild rabbit population. No calculations were possible.

11. Sweet Corn

All the corn was not fully developed when harvested on October 2nd because the actual planting was somewhat late in the local season. 57 heads of corn were harvested in the treated experimental group, while only 43 heads of corn were harvested in the untreated control group. The yield of the treated experimental group represents an increase of 30.2% over the untreated control group.

12. Green Valiant Broccoli and Snow Crown Cauliflower

The biggest broccoli head was 0.45 lbs in the treated experimental group, while the biggest broccoli head in the untreated control group was 0.72 lbs. The yield weight of treated broccoli showed a decrease of 37.5% relative to the untreated broccoli. The largest cauliflower head in the treated experimental group was 0.79 lbs while the largest cauliflower head in the untreated control group was 1.15 lbs. The yield weight of treated cauliflower showed a decrease of 31.3% relative to the untreated cauliflower.

All documents cited above are hereby incorporated in their entirety by reference. Also incorporated in their entirety by reference are the following: Hou et al, Am. J. Chinese Med. 22(1):1 (1994); Hou et al, Am. J. Chinese Med. 22(2):103 (1994); and Hou et al, Am. J. Chinese Med. 22(3–4): 205 (1994)

One skilled in the art will appreciate from a reading of this disclosure that various changes in form and detail can be made without departing from the true scope of the invention.

What is claimed is:

1. A method of stimulating growth or development of a plant, comprising the steps of:

subjecting the plant to sound waves having a frequency less than 4000 Hertz; and applying to the plant a nutrient composition comprising humic acid.

2. The method according to claim 1 wherein said plant is a vegetable plant.

3. The method according to claim 1 wherein said plant is a fruit-bearing plant.

4. The method according to claim 1 wherein said plant is an ornamental plant.

5. The method according to claim 1 wherein said plant is a tree.

6. The method according to claim 1 wherein said plant is a vine, shrub or bush.

7. The method according to claim 1 wherein said frequency is in the range of about 50 Hz to less than 4000 Hz.

8. The method according to claim 7 wherein said frequency is 50–3800 Hz.

9. The method according to claim 8 wherein said frequency is 50–500 Hz.

10. The method according to claim 9 wherein said frequency is 50–300 Hz.

11. The method according to claim 10 wherein the frequency is 150–300 Hz.

12. The method according to claim 11 wherein the plant is a corn, potato, cabbage, pea, bean or soybean plant.

13. The method according to claim 10 wherein the frequency is about 100 Hz.

14. The method according to claim 13 wherein the plant is a radish, spinach, lettuce, cucumber, cantaloupe or watermelon plant.

15. The method according to claim 1 wherein said plant is subjected to said sound waves while said composition is disposed on said plant.

16. The method according to claim 1 wherein said composition further comprises at least one of manganese, iron, copper, or zinc.

17. The method according to claim 1 wherein said composition further comprises manganese, iron, copper and zinc.

18. The method according to claim 1 wherein said composition is gibberellin free.

19. The method according to claim 1 wherein said composition further comprising nitrogen, phosphorus and potassium.

20. The method according to claim 1 wherein said plant is other than a broccoli or cauliflower plant.

21. A method of increasing disease resistance of a plant, comprising the step of:

subjecting said plant to sound waves of a frequency of 50–3800 Hz at a volume and for a time sufficient to effect said increased disease resistance.

22. The method according to claim 21 wherein said frequency is 50–3000 Hz.

23. The method according to claim 21 further comprising contacting said plant with a nutrient formulation.

* * * * *